(12) United States Patent
Copeland

(10) Patent No.: US 12,260,006 B2
(45) Date of Patent: *Mar. 25, 2025

(54) DISTRIBUTED AND AUTONOMOUS DATA SECURITY AGENT

(71) Applicant: Scott R. Copeland, Pasadena, TX (US)

(72) Inventor: Scott R. Copeland, Pasadena, TX (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/850,011

(22) Filed: Jun. 27, 2022

(65) Prior Publication Data

US 2022/0327247 A1  Oct. 13, 2022

Related U.S. Application Data

(63) Continuation-in-part of application No. 16/876,003, filed on May 16, 2020, now Pat. No. 11,423,181.

(51) Int. Cl.
  *G06F 21/78* (2013.01)
(52) U.S. Cl.
  CPC ...... *G06F 21/78* (2013.01); *G06F 2221/2121* (2013.01)
(58) Field of Classification Search
  CPC ........................................ G06F 21/78
  See application file for complete search history.

(56) References Cited

U.S. PATENT DOCUMENTS

2014/0164776 A1* 6/2014 Hook .................. G06F 21/6218
  713/171
2021/0157312 A1* 5/2021 Cella ................... G01M 13/045

* cited by examiner

*Primary Examiner* — Simon P Kanaan
(74) *Attorney, Agent, or Firm* — Sherman D. Pernia

(57) ABSTRACT

The present invention is a distributed and autonomous digital data security agent that secures stored data and the storage device itself, from remote manipulation. The present system is an "agent" in that it acts independently in the accomplishment of its objects and is distributed in that its functionality is resides on firmware resident at disparate hardware locations. The agent is autonomous in that it cannot be remotely compromised. The system includes server having a dedicated Private link with a Chip Administrator, and a Data Link between a first-Chip, a second: Chip of said security agent. The first-Chip is resident and operable to control Write/Read calls and data transfers between the server and the second: Chips of the data storage. The Chip Administrator, first-Chip and second-Chip in combination with their associated Firmwares provide said distributed and autonomous data security agent.

14 Claims, 19 Drawing Sheets

Figure 1 - System Overview

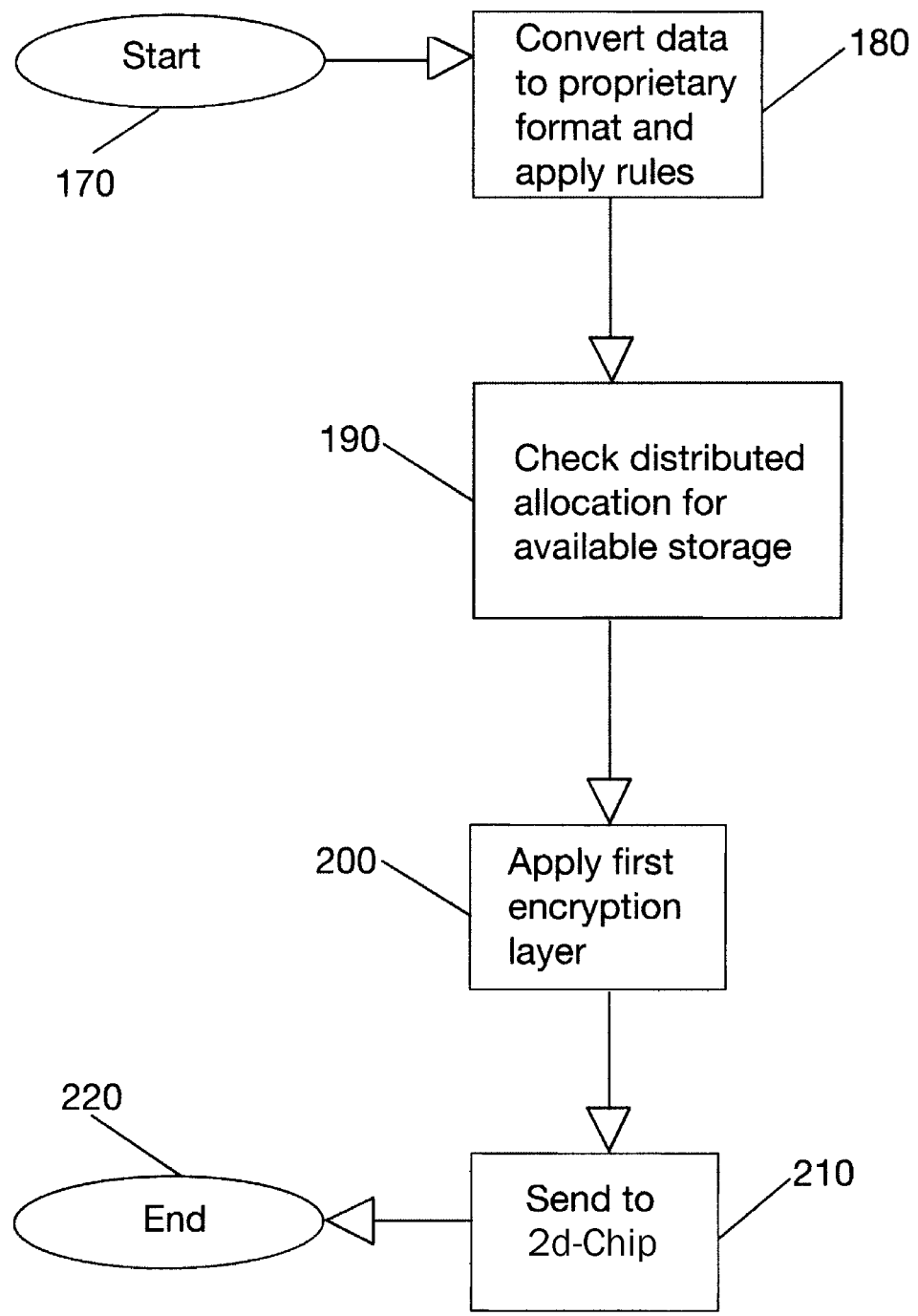
Figure 3A - First-Chip Input Logic

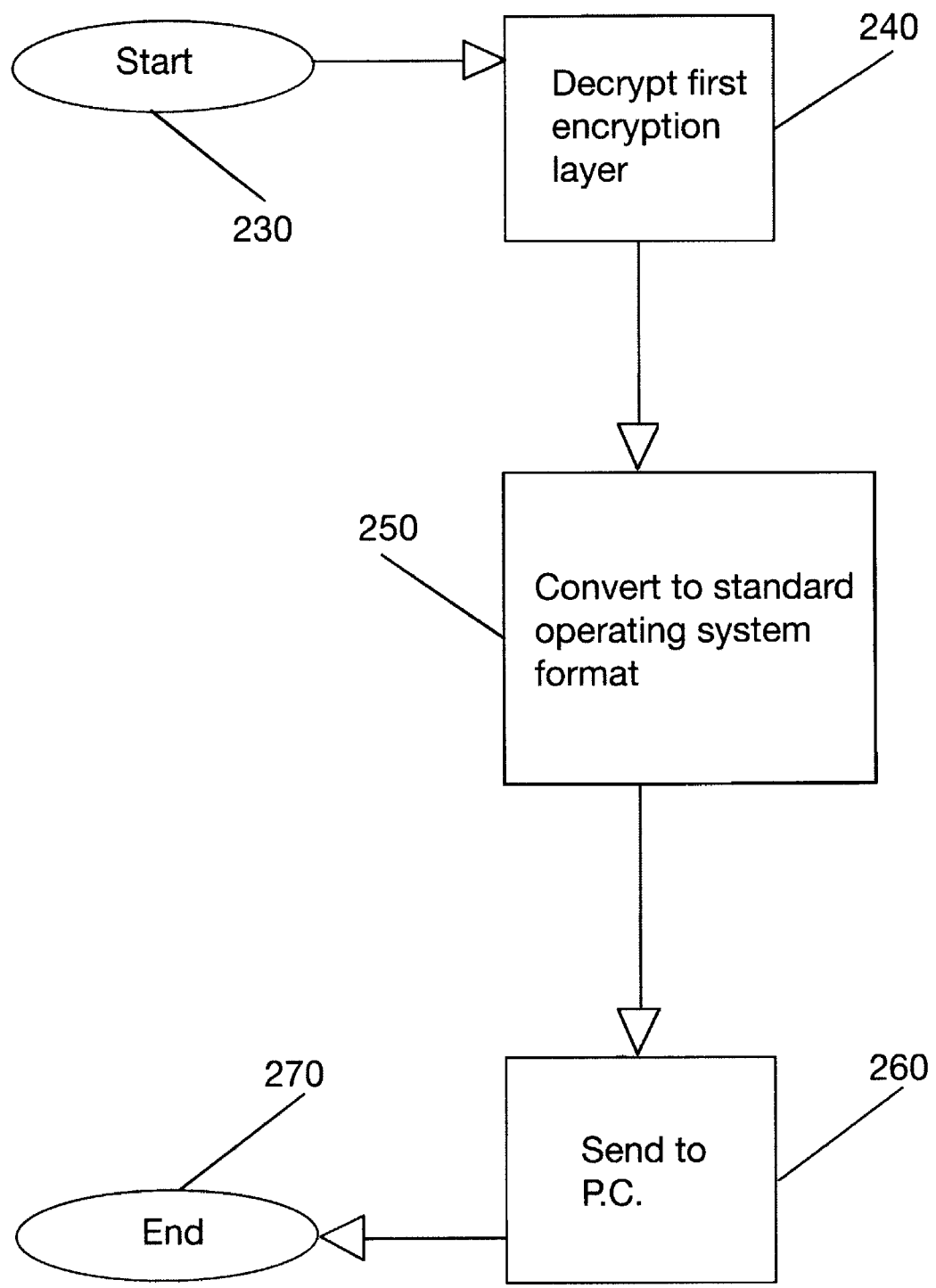

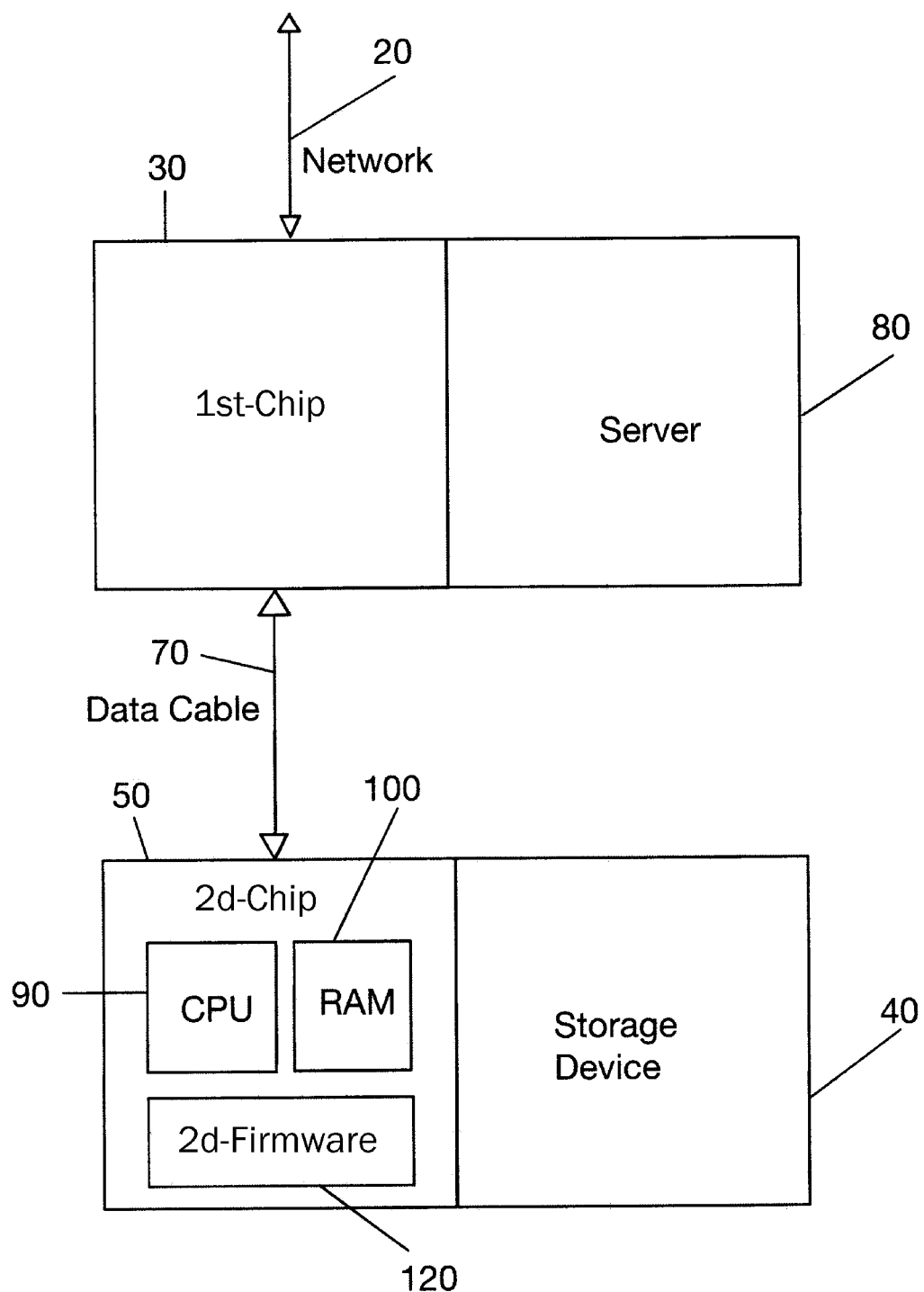
Figure 4 - Second-Chip

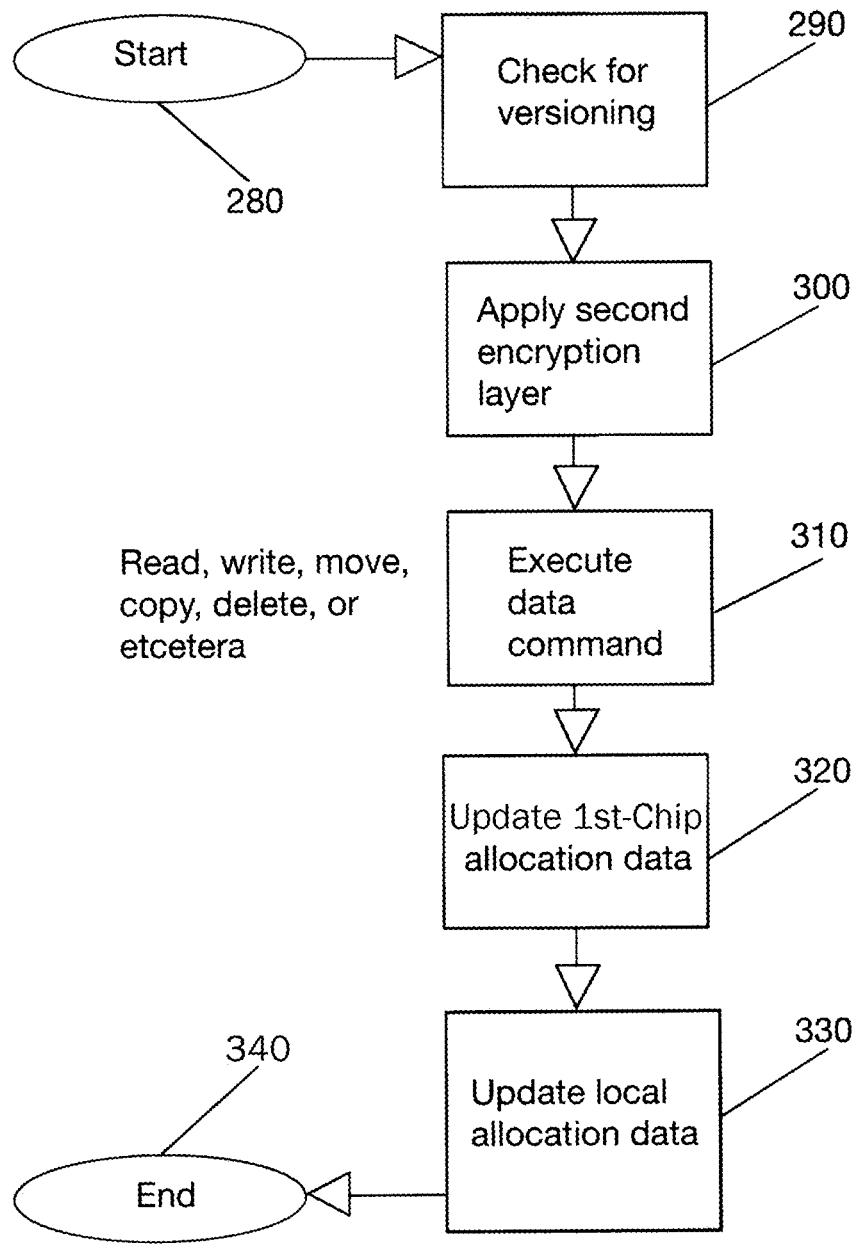

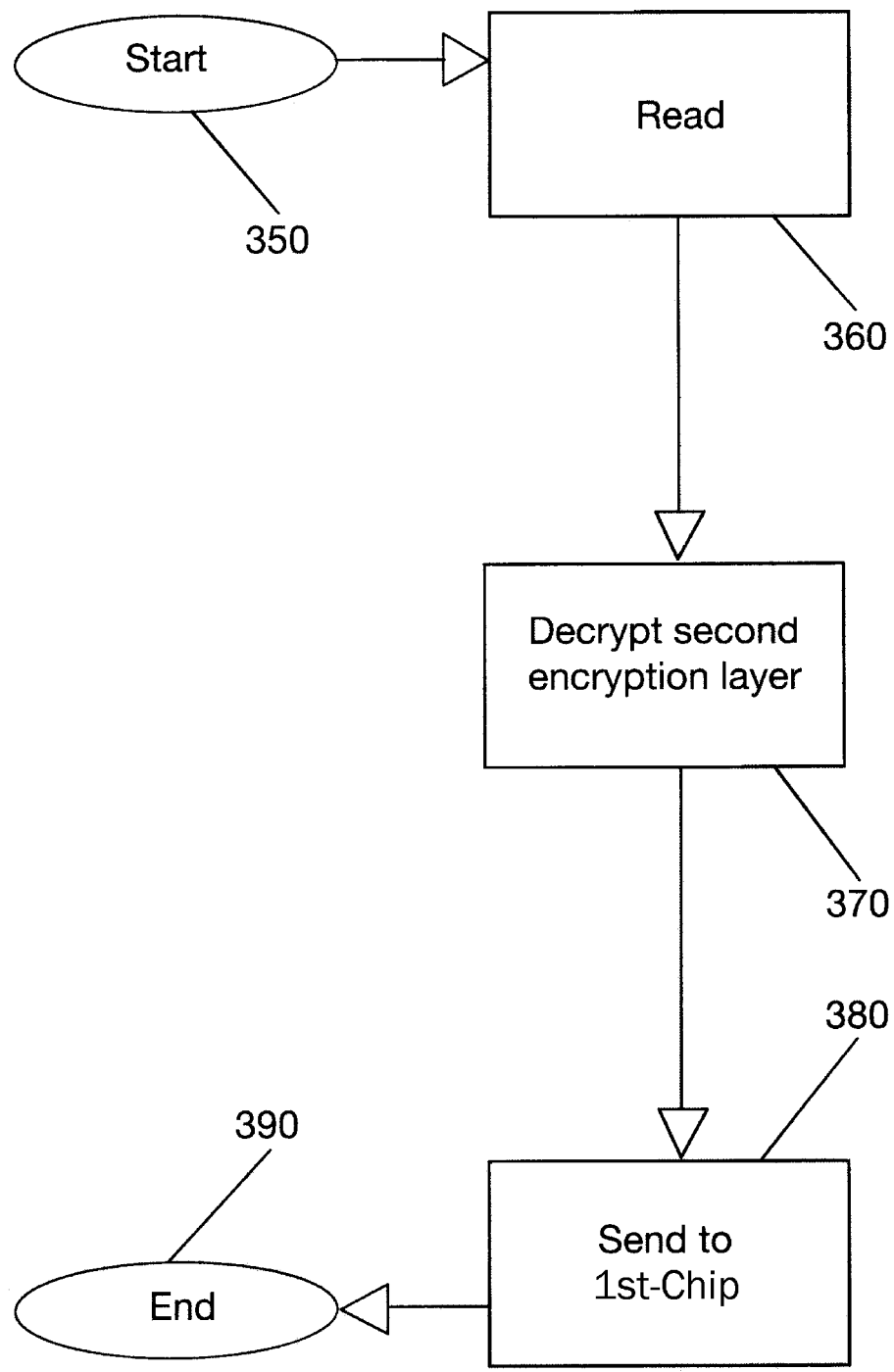

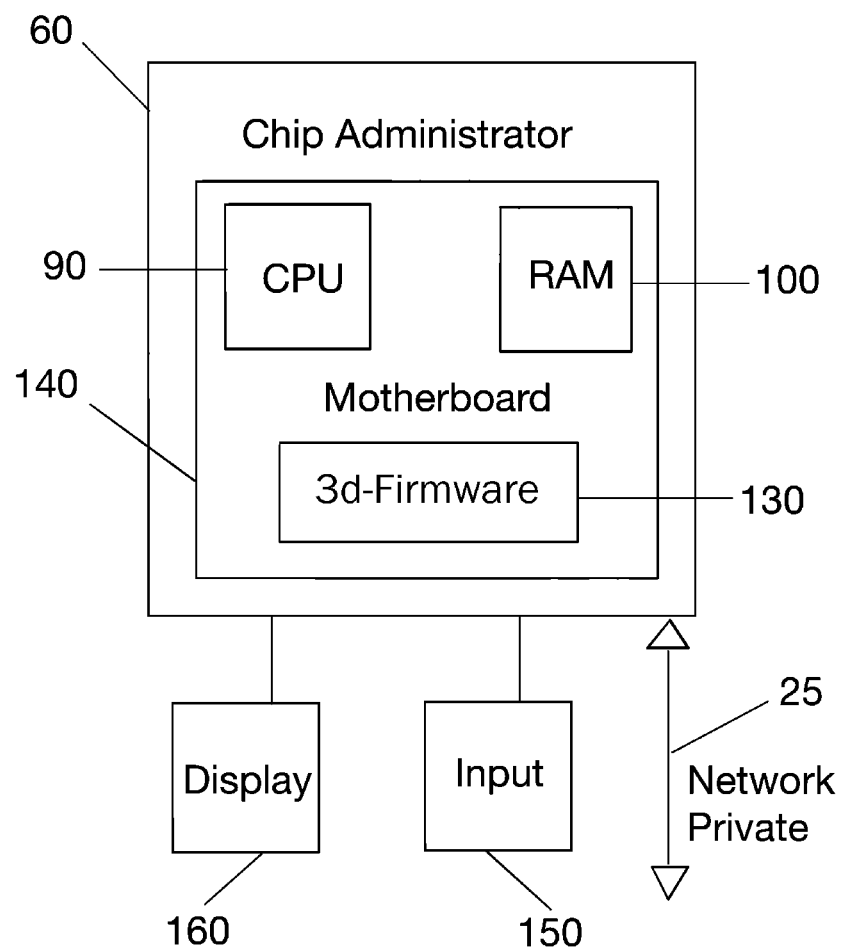

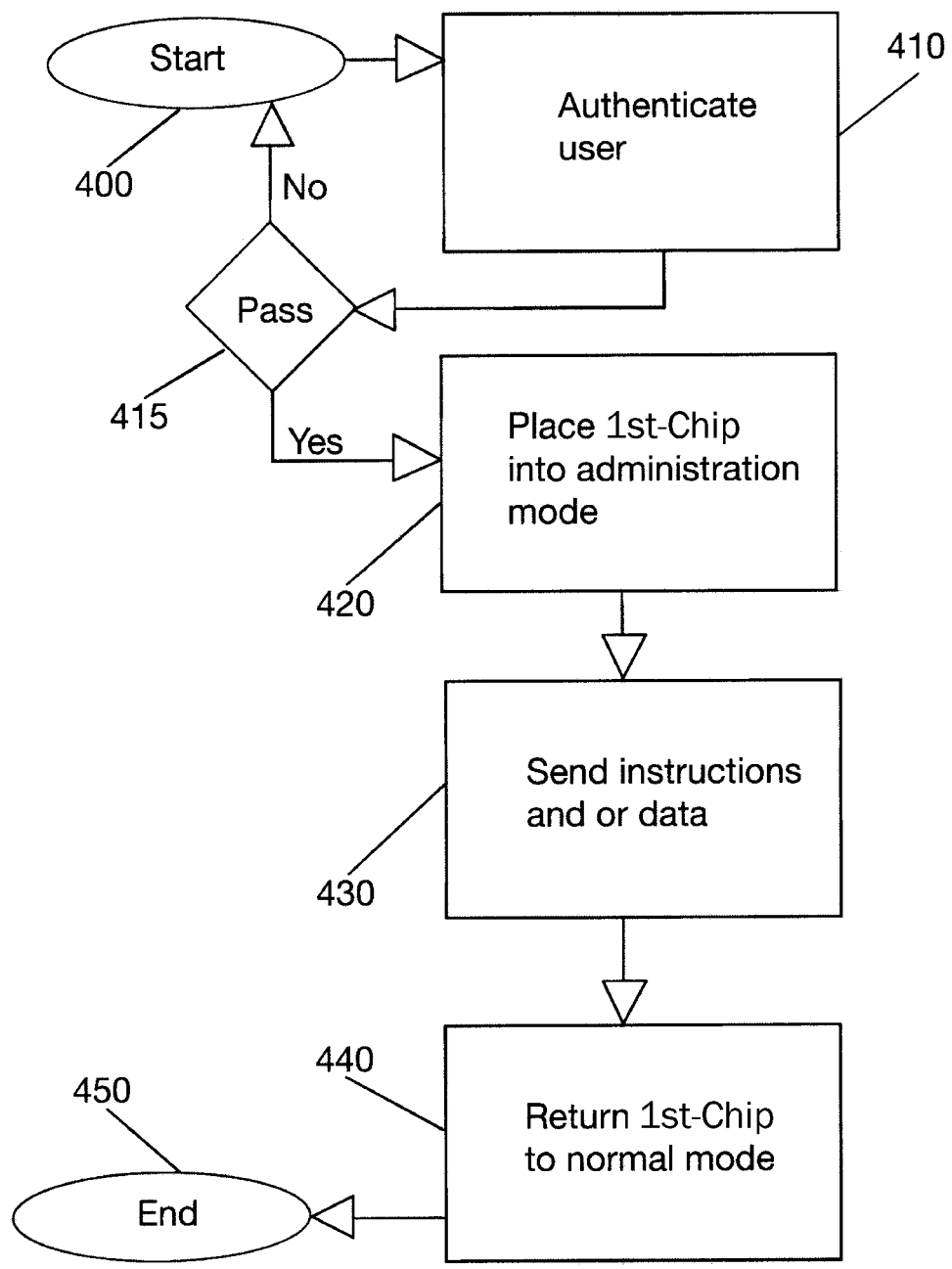
Figure 7 - Chip Administrator Logic

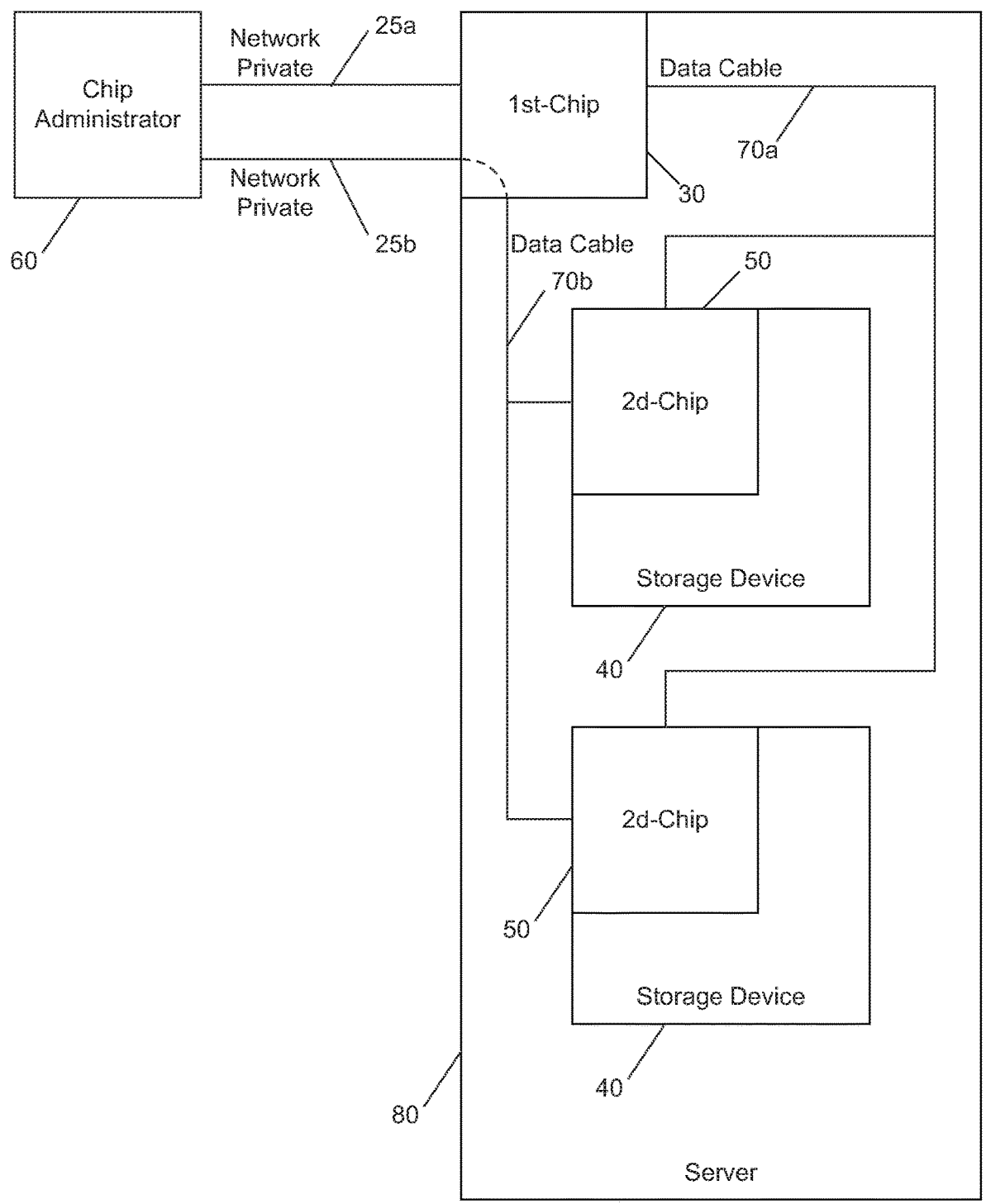

DISTRIBUTED AND AUTONOMOUS DATA SECURITY AGENT

The present application claims the benefit of U.S. patent application Ser. No. 16/876,003 filed May 16, 2020, the content of which is included herein by reference.

BRIEF DESCRIPTION OF THE DRAWINGS

FIG. 3A is a logic diagram showing first-Chip modifying the data before sending it to second-Chip.

FIG. 3B is a logic diagram Showing Data coming from second-Chip to first-Chip which is modified by first-Chip and sent to a P.C.

FIG. 4 shows second-Chip architecture and relationship between the Storage Device second-Chip and first-Chip.

FIG. 5A is a logic diagram showing second-Chip modifying the data and or command before sending it to the Storage Device.

FIG. 5B is a logic diagram showing second-Chip reading data from the Storage Device and modifying to before sending the data to first-Chip.

FIG. 6 shows the architecture of the Chip Administrator and its relationship with the Private Network.

FIG. 7 is a logic diagram showing the basic function of the Chip Administrator.

FIG. 8C is a schematic diagram illustrating a Chip Administrator using two Networks Private 25a & 25b to communicate with a 1st-Chip, and also with one or more 2d-Chips by passing the communication through the 1st-Chip via a separate Data Cable to the 2d-Chips.

In this embodiment, a Data Allocation Index feature for the processing of file commands is located on the 1st-Chip and on each of the 2d-Chips of the present invention, which also substantially abstracts file allocation data processing and storage from the medium of its associated Storage Device.

Figure 9A:
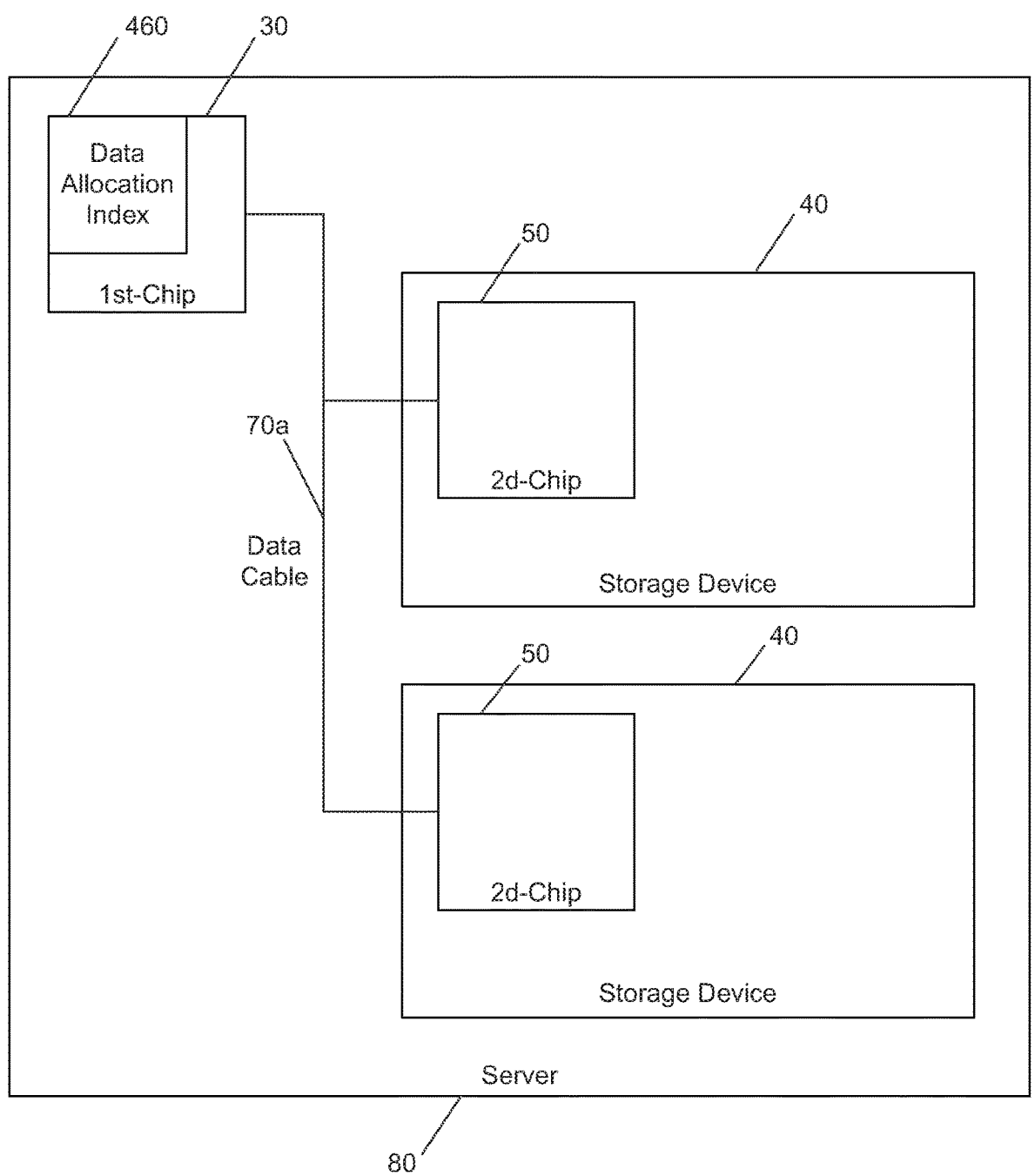
FIG. 9A is a schematic diagram illustrating the abstraction of file allocation feature of the present invention. In the exemplified embodiment, a server has one or more associated Storage Devices, each Storage Device has an associated 2d-Chip connected by a Data Cable to a 1st-Chip.
Figure 9B:
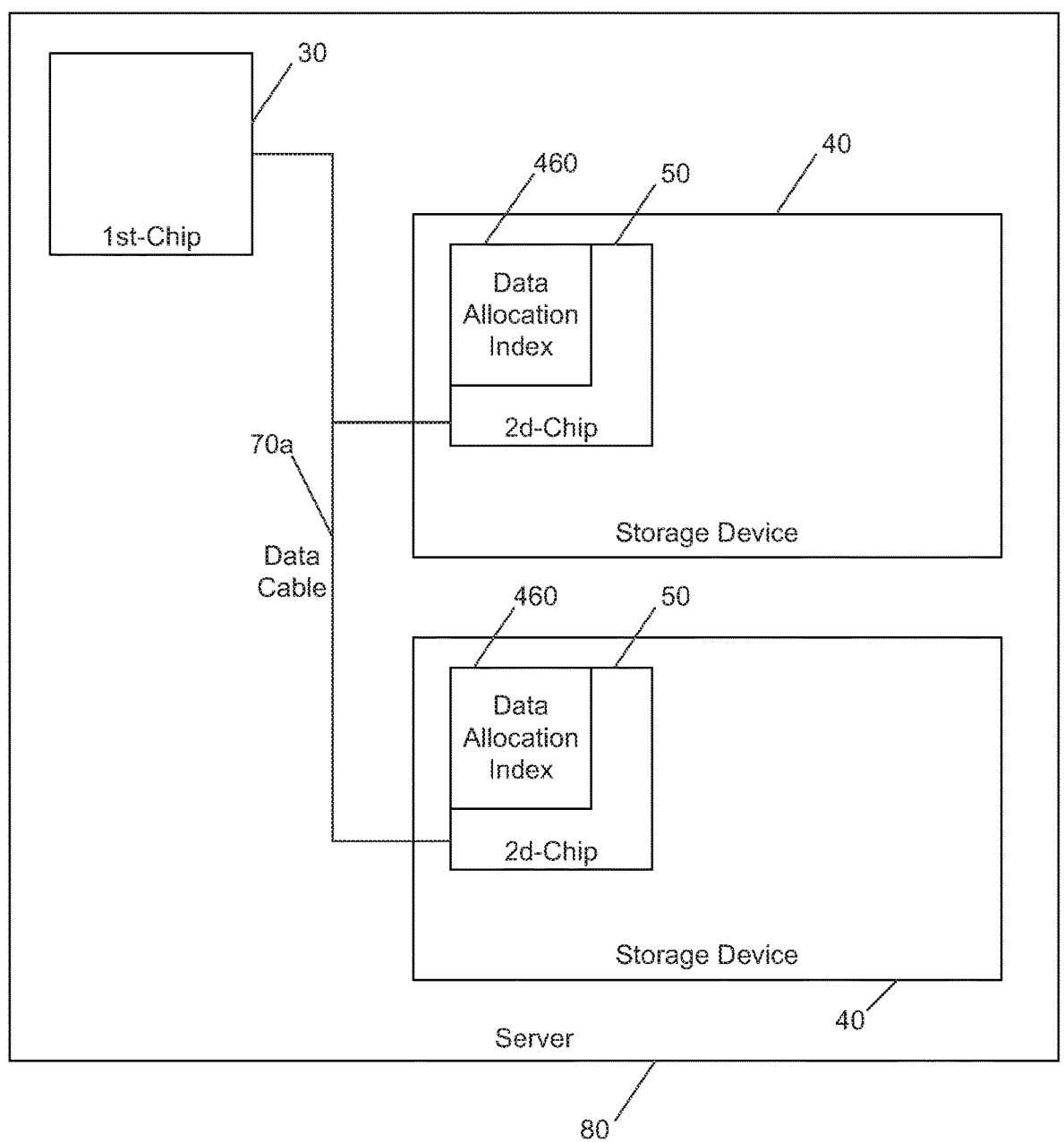
FIG. 9B is a schematic diagram illustrating an alternative means for accomplishing the abstraction of file the allocation feature of the present invention. In this embodiment, the Data Allocation Index feature for the processing of file commands is located on each of the 2d-Chips of the present invention, which still substantially abstracts file allocation data processing and storage from the medium of its associated Storage Device.
Figure 9C:
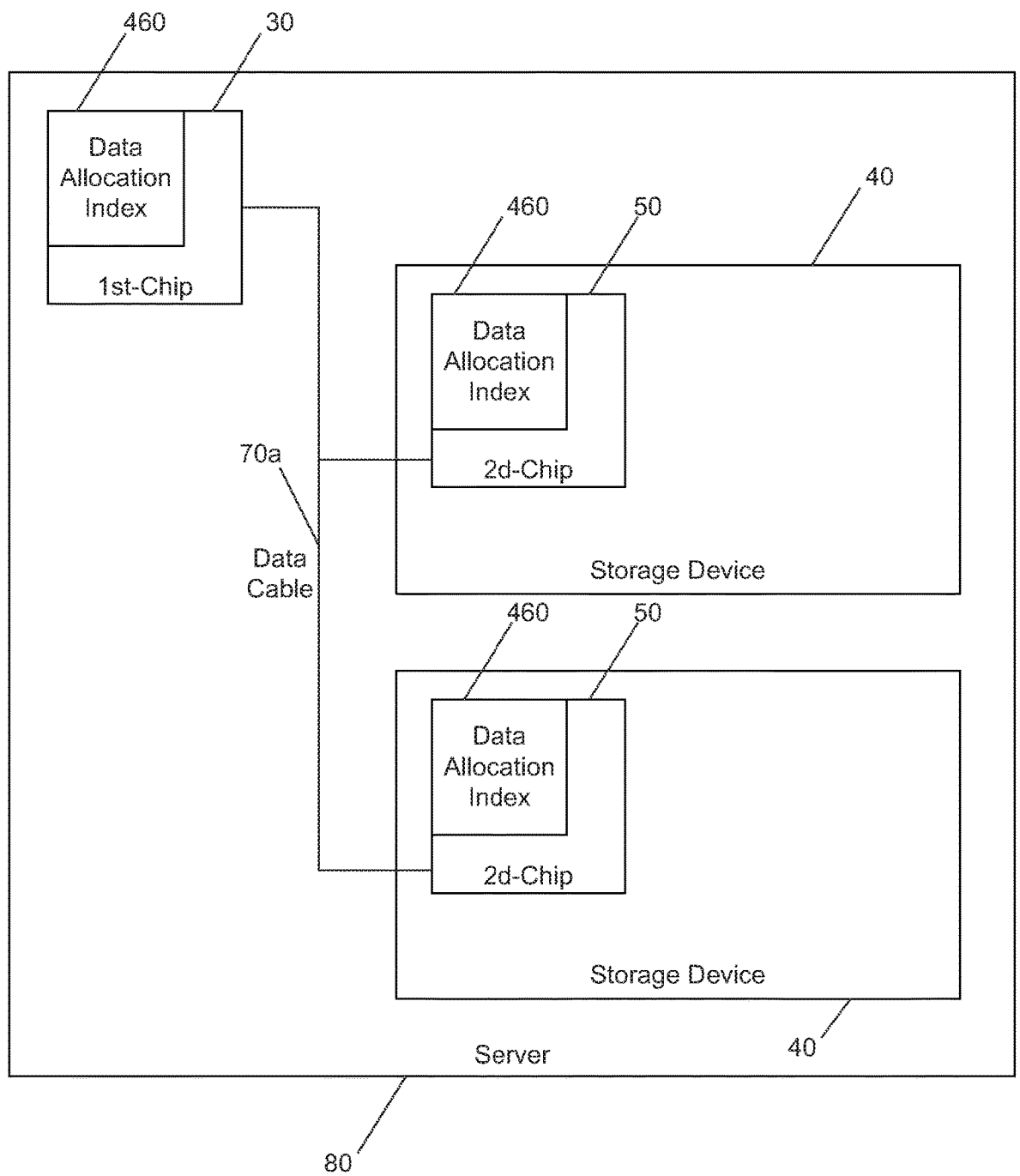
FIG. 9C is a schematic diagram illustrating a next alternative means for accomplishing the abstraction of file the allocation feature of the present invention.
Figure 9D:
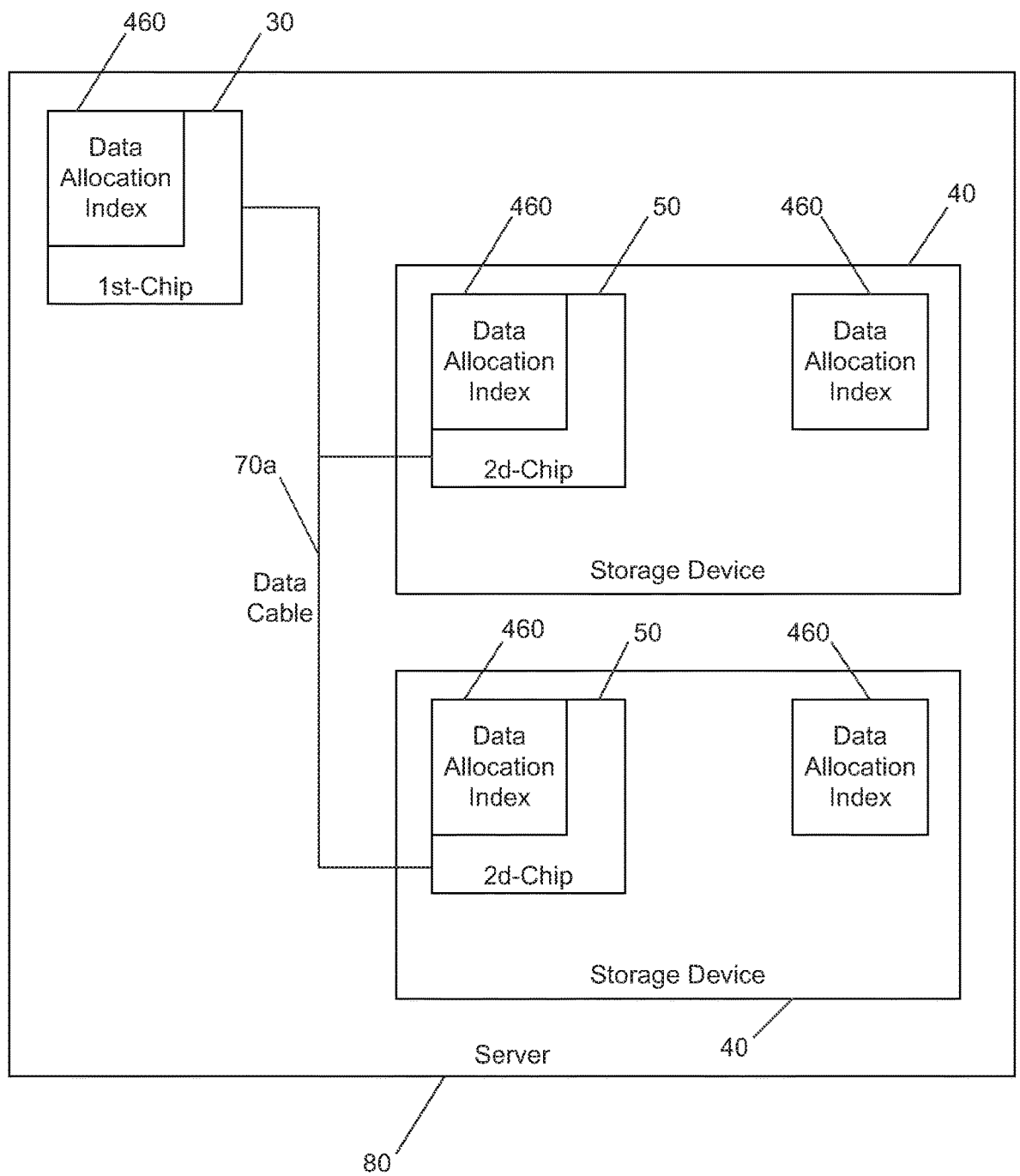

FIG. 9D is a schematic diagram illustrating a further alternative means for accomplishing the abstraction of file the allocation feature of the present invention. In this embodiment, a Data Allocation Index feature for the processing of file commands is located on the 1st-Chip and on each of the 2d-Chips as in FIG. 9C. However, in this example a Data Allocation Index feature (separate from a Chip) also resides on each of the Storage Devices as well. Having three, or more, distinct Data Allocation Indexes enables the present invention to create parity among the aggregated Data Allocation Indexes.

Figure 10A:
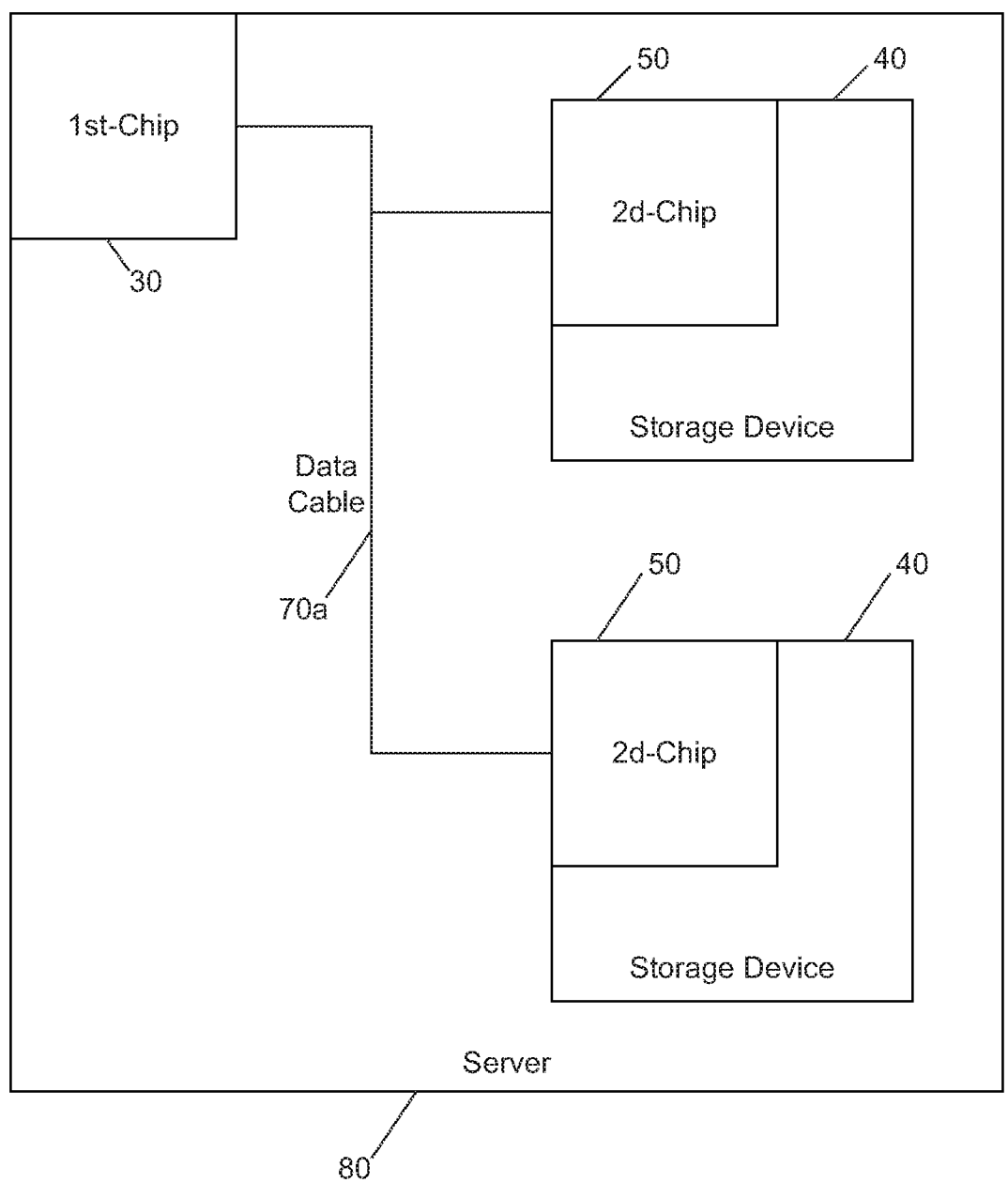

FIG. 10A is a schematic diagram illustrating a Server hosting a 1st-Chip communicating with one or more 2d-Chips, wherein each 2d-Chip is integrated into a Storage Device. In this embodiment, removing and replacing the Storage Device also replaces the integrated 2d-Chip.

Figure 10B:
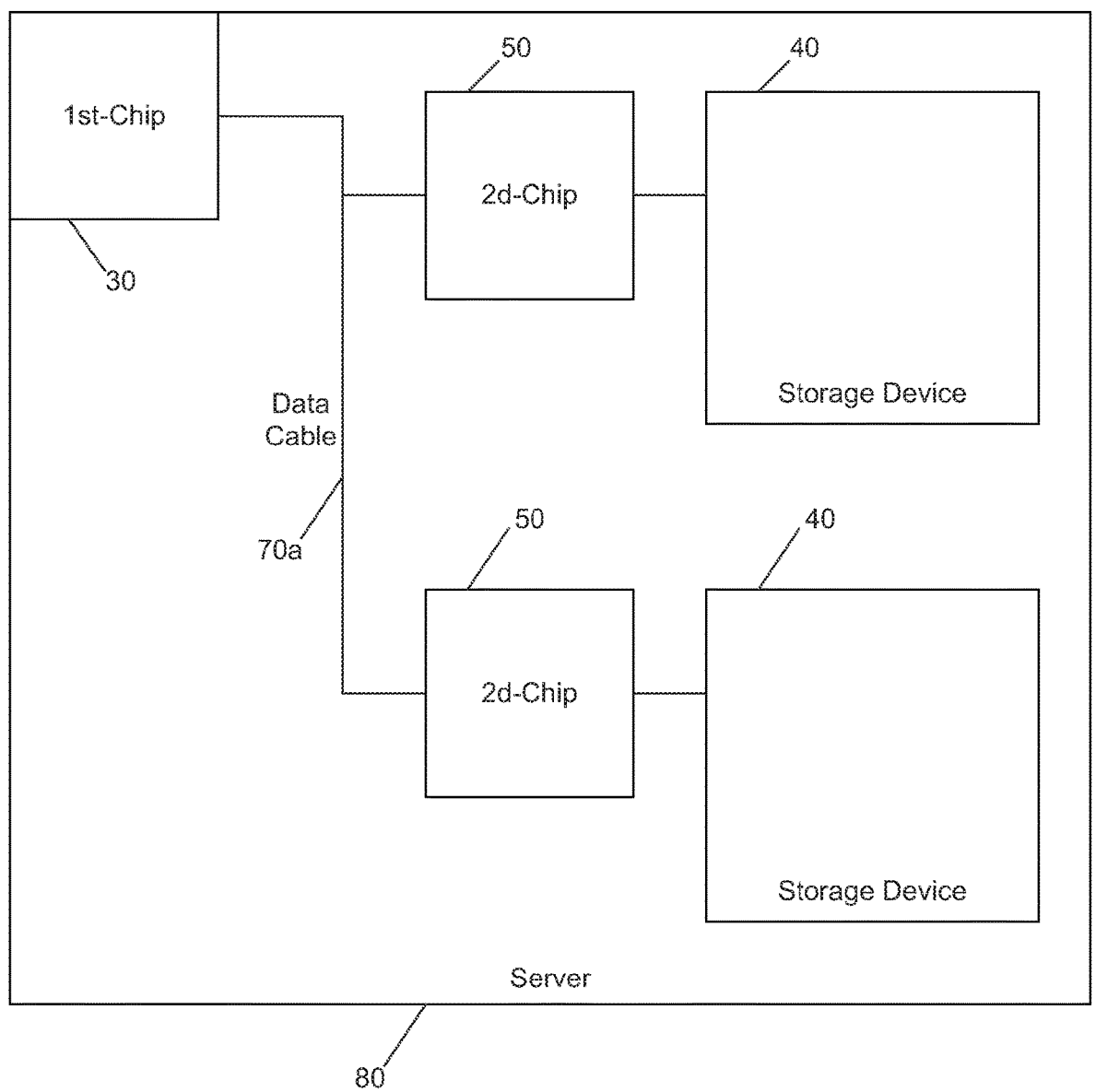

FIG. 10B is a schematic diagram illustrating a Server hosting a 1st-Chip communicating with one or more 2d-Chips, wherein each 2d-Chip is independent of its associated Storage Device. In this embodiment, replacing the Storage Device does not replace the 2d-Chip.

Figure 11:
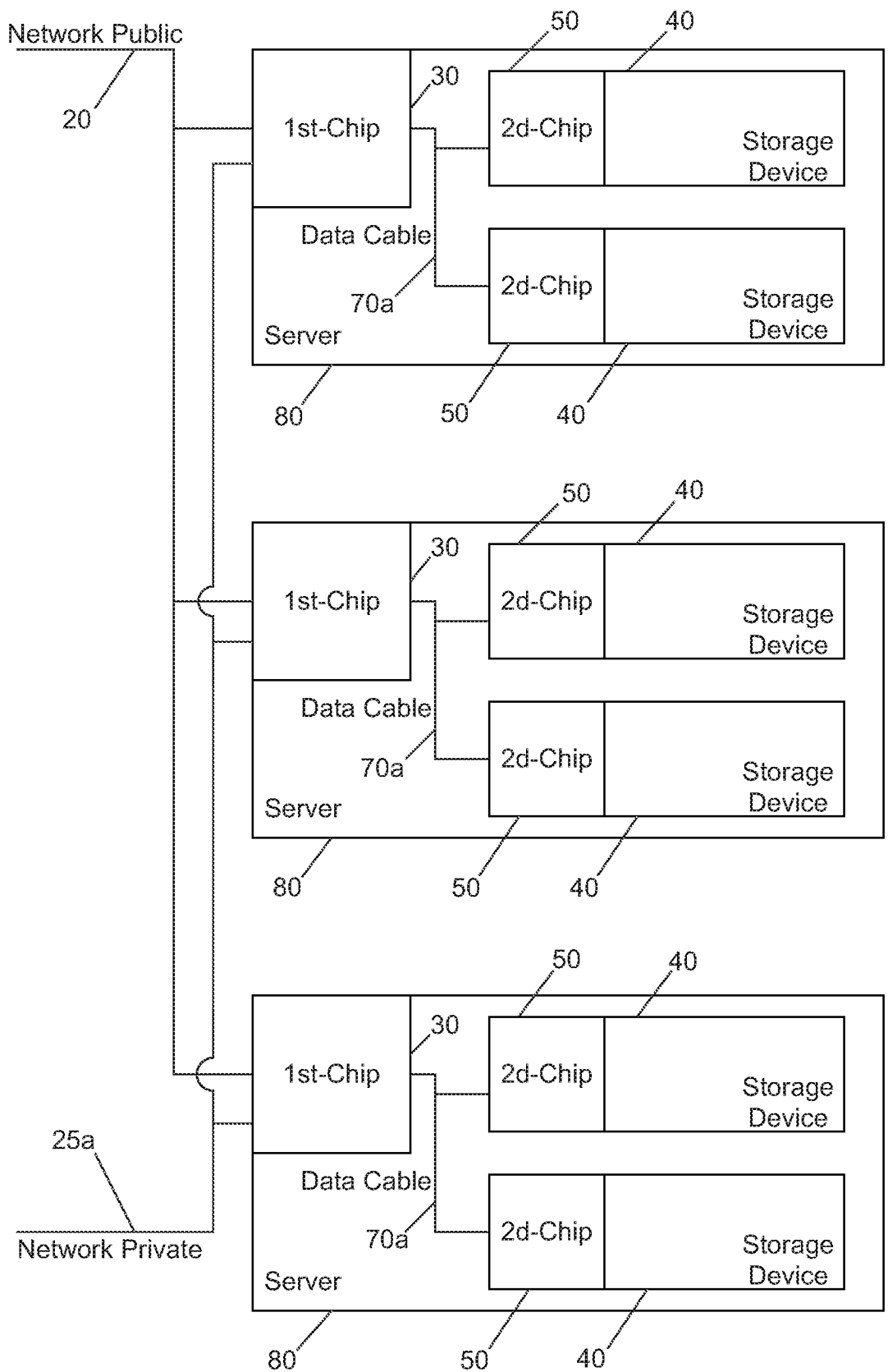

FIG. 11 is a schematic diagram illustrating an embodiment wherein a plurality of Servers each hosts its own 1st-Chip, and each 1st-Chip communicating with plurality of 2d-Chip/Storage Device set, all under Chip Administrator control via the Network Private.

TABLE OF FIGURE REFERENCES

10—P.C.
20—Network Public
25, 25a, 25b—Network Private
30—first-Chip (1st-Chip)
40—Storage Device
50—second-Chip (2d-Chip)
60—Chip Administrator
70, 70a, 70b—Data Cable
80—Server
90—CPU
100—RAM
110—first-Firmware (1st-Firmware)
120—second-Firmware (2d-Firmware)
130—third-Firmware (3d-Firmware)
140—Motherboard
150—Input
160—Display
170—Start first-Chip Input Logic
180—Convert Data
190—Check Allocation
200—Encryption
210—Send to second-Chip
220—End first-Chip Input Logic
230—Start first-Chip Output Logic
240—Decrypt
250—Convert for O.S.
260—Send to P.C.
270—End first-Chip Output Logic
280—Start second-Chip Input Logic
290—Check for Versioning
300—Encryption
310—Data Command
320—Update first-Chip Allocation
330—Update Local Allocation
340—End second-Chip Input Logic 350—Start second-Chip Output Logic
360—Read
370—Decrypt
380—Send to first-Chip
390—End second-Chip Output Logic
400—Start Chip Administrator Logic
410—Authenticate User
415—Pass
420—Initiate Administrator Mode
430—Send Instructions and or Data
440—Return to Normal Mode
450—End Chip Administrator Logic
460—Data Allocation Index

DETAILED DESCRIPTION OF THE INVENTION

Referring now to the drawings, the details of preferred embodiments of the present invention are graphically and schematically illustrated. Like elements in the drawings are represented by like numbers, and any similar elements are represented by like numbers with a different lower case letter suffix.

The present invention is a distributed and autonomous data security agent that secures digitally stored data, as well as the storage device itself, from remote manipulation. The present system of data storage security is an "agent" in that it acts independently in the accomplishment of its objects. It is distributed in that its functionality is resides on firmware resident at disparate hardware locations. The agent is autonomous in that it cannot be remotely compromised—even by an administrative user.

Figure 1:
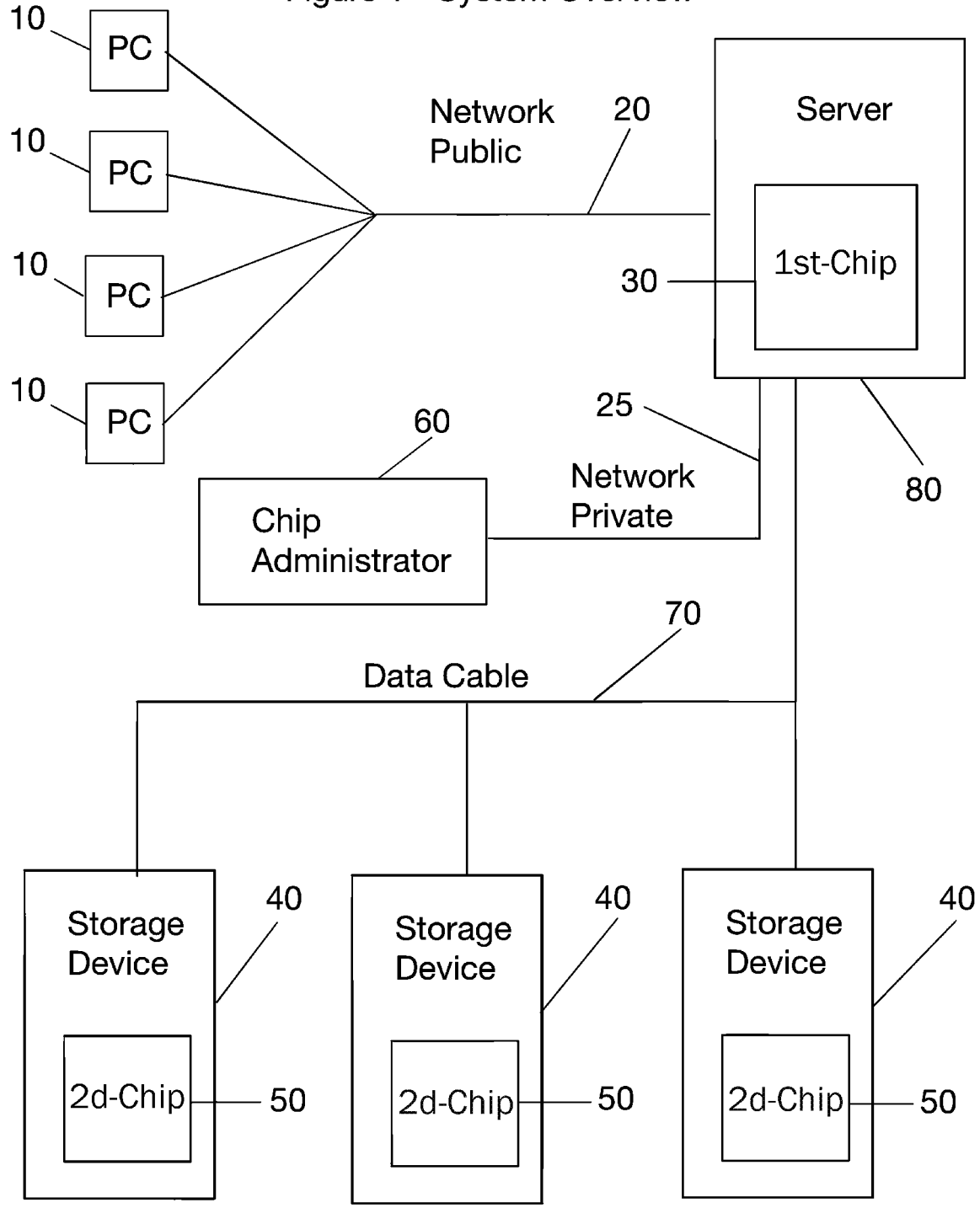
FIG. 1 is a schematic overview of the system.

FIG. 1 is a schematic drawing providing an overview of the present distributed and autonomous data security agent practiced in a computer server system. As illustrated in the figure, a plurality of PCs 10 connect to a network public 20 allowing the PCs 10 access to a plurality of storage devices 40 residing in a server 80. The server 80 has a first-Chip 30 which independently applies the present methodology to the data stream before forwarding it, via a data cable 70, to second-Chip 50. Second-Chip 50 applies additional methodology to the data before committing the data to the storage device 40. Both first-Chip 30 and second-Chip 50 are functionally independent of a traditional server system. The methodology they apply can not be seen or bypassed by the PCs 10. Only the Chip Administrator 60 via a Network Private 25 can see first-Chip 30 and communicate with it. No element of the system's Network Private 25 and/or Network Public 20 can see or influence (hack) second-Chip 50, which acts autonomously of the server system preventing any corruption of its second-Firmware 120. Since both first-Chip 30 and second-Chip 50 can not be seen or influenced by (i.e., is abstracted from) the PCs 10 or the network public 20, the Chips (30 & 50) can both apply the methodology to protect the data from corruption, hacking, etc. in a two stage process.

Figure 2:
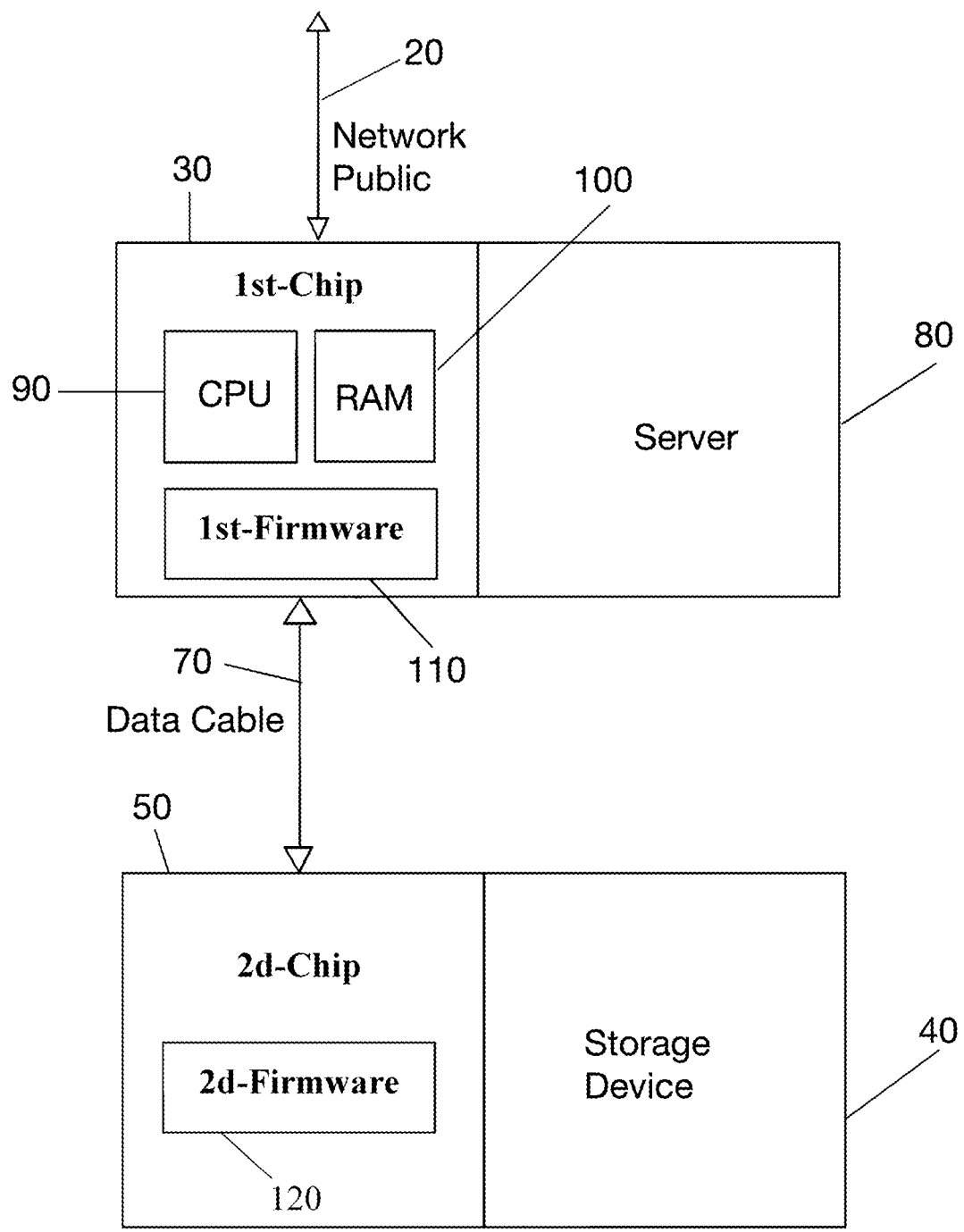
FIG. 2 shows first-Chip architecture and the relationships between the first-Chip and the Network Public, and the first-Chip and the second-Chip.

As illustrated in FIG. 2, first-Chip 30, which resides in the server 80 sends and receives (**intercepts before the server sees it?) data to & from PCs 10 via the Network Public 20. The PCs 10 which communicate with the server 80 are unaware that first-Chip 30 is applying the methodology (i.e., applying rules for handling data, reformatting the data, encrypting, etc.) via code of first-Firmware 110 of first-Chip 30. Since first-Chip 30 has its own CPU 90 and RAM 100, it is able to modify incoming or outgoing data as it is directed by its methodology to ensure the data are protected. Because first-Chip 30 is abstracted from the Network Public 20, there is no access vector for attack on first-Chip 30. After first-Chip 30 has applied its methodology to the data, in a preferred embodiment it uses a data cable 70 to send the data to second-Chip 50 which communicates with the storage device 40.

FIG. 3A shows the Start 170 of first-Chip's 30 input logic. As illustrated, when first-Chip 30 receives incoming data from the Network Public 20 it Converts 180 the incoming data from a traditional format (e.g., NTFS, HFS+, EXT 4, etc.) into a proprietary format and applies any rules (send data to a specific storage device 40, send copies to multiple storage devices 40, etc.) according to the processes established for it—the first-Chip methodology. First-Chip 30 then Checks 190 a pre-allocation table to determine which data storage device 40 to route the data to but does not itself directly cause data to be stored. Additionally, first-Chip 30 can add an encryption layer 200 to the data to be stored. After first-Chip 30 is finished applying its methodology to the incoming data, it Sends 210 the now first-Chip modified data to second-Chip 50, thus Ending 220 its manipulation of incoming data and sending it for storage.

Conversely, as shown in FIG. 3B, the output logic of first-Chip 30 is set forth. Receiving previously stored first-Chip modified data from second-Chip 50 via the data cable 70, initiates the Start 230 of first-Chip's 30 output logic. The recalled/previously stored first-Chip modified data received from second-Chip 50 is Decrypted 240 and Converted 250 from its proprietary format back into the format that the PC 10 is expecting to see (i.e., into the same format in which it was originally transmitted by the PC 10. The now reconstituted outgoing data is then Sent 260 to the PC 10 requesting the data, thus Ending 270 first-Chip's application of its methodology to the outgoing data.

As illustrated in FIG. 4, second-Chip 50 resides on storage devices 40 of the storage device array of the server, and receives first-Chip modified data from first-Chip 30 via the data cable 70 connection. Second-Chip 50 applies its methodology to the first-Chip modified data and sends the now second-Chip modified data to the storage device 40. Additionally, second-Chip 50 can retrieve data from the storage device 40, remove the second-Chip modified methodology (i.e., removing the second-Chip modification from the second-Chip modified data) and sending the now first-Chip modified data via data cable 70 back to first-Chip 30 for processing and output. Second-Chip 50, having its own CPU 90 and RAM 100, is enabled to apply its methodology as coded in second-Firmware 120 fully independent of any other system component. Second-Chip 50 is extracted from the whole of the system of FIG. 1, and no element or feature of the system's Network Private 25 and/or Network Public 20 can see or influence (hack) second-Chip 50. This ensures that second-Chip's fully independent control over the data it stores on the storage device 40 is never compromised.

Turning now to the functional operation of second-Chip 50, FIG. 5a shows the Start 280 of second-Chip's input logic methodology. When second-Chip 50 receives first-Chip modified data via the data cable 70, it Checks 290 for previous versions of the first-Chip modified data in the second-Chip modified data on the storage device 40. If necessary second-Chip 50 will exercise versioning of associated data on the storage device 40. Second-Chip 50 then may apply an optional Encryption 300 layer to the received first-Chip modified data. Second-Chip 50 then executes the methodology 310 (i.e. copy, delete, read, write, move, etc.). Once these logic steps have been followed, second-Chip 50 calculates as necessary the amount of available data that the storage device 40 will have and send the updated amount to the pre-allocation table of first-Chip 30. This allows first-Chip 30 to allocate data, based on each of the storage devices' 40 true remaining available storage capacity. While first-Chip 30 is in a "normal" mode (normal mode versus administration mode is explained below), second-Chip only reports the current version of any given piece/set of data and hides the previous versions, if any. It also tags files as deleted, but does not actually delete them outside of its own rule set. Without this feature, the PC's 10 and first-Chip 30 would miscalculate available storage, absent having second-Chip report the available storage to first-Chip's pre-allocation table. In view of the pre-allocation table, first-Chip has no confusion as to which storage device has an adequate amount of available storage for any given task, and connected PC's 10 will report correct storage amounts to a user. Once the pre-allocation data is sent to first-Chip 30, second-Chip 50 updates its own allocation table 320 on the storage device 40 to which it is assigned. This Ends 340 the methodology of second-Chip's 50 input logic.

Conversely, second-Chip's 50 output logic is shown in FIG. 5b. The output logic methodology Starts 350 when a Read 360 request is received from first-Chip 30. After receiving the data read request, second-Chip 50 Reads 360 the latest second-Chip modified version of the requested data from the storage device 40. Any encryption layer or other second-Chip modification is removed by the Decrypt 370 process and the data is Sent 380 as recalled first-Chip modified data to first-Chip 30 via a data cable 70. This Ends 390 second-Chip's output logic methodology.

FIG. 6 is a schematic giving an overview of the functionally and I/O features of the Chip Administrator 60 of the distributed, autonomous data security agent. The Chip Administrator 60 consists of a motherboard 140, a CPU 90, a RAM 100, and third-Firmware 130. The Chip Administrator 60 may be directly connected to any number of input devices 150 (i.e. biometric devices, keyboard, mouse, etc.), and to a display device 160, to give the user a visual representation of their interactions with the Chip Administrator 60. In FIG. 6, the Chip Administrator 60 is connected to a Network Private 25. The Network Private 25 allows the Chip Administrator 60 in this embodiment is shown to interact with one first-Chip and server combination. However, the Chip Administrator may be configured to interact via a Network Private with a plurality of first-Chips 30, as shown in FIG. 11.

FIG. 7 shows the Chip Administrator 60 logic. The authentication process Starts 400 when a user attempts access by Authenticating 410 the user via any of a myriad of known authenticating means (e.g., username & password, biometrics, etc.). Once the user has been through Authentication 410 and Passed 415, one or more first-Chips 30 are put into an Administrative mode 420. Administration Mode 420 allows actions that are not permitted by the system's Normal Mode (changing file versions, seeing files that second-Chip 50 has marked as deleted, etc.). It is important to note that even though the Chip Administrator can see the true state of the storage device 40, it is unable to issue commands directly to second-Chip 50. The Chip Administrator can only authorize first-Chip 30 to send administrative commands to second-Chip 50. Once in Administration Mode 420, the Chip Administrator 60 can send instructions and data 430 (i.e., software updates, version modifications, etc.) to first-Chip 30 which in turn will be sent as "acceptable" commands to second-Chip 50. When the user is finished administration of the system, they can exit the Chip Administrator 60 and the first-Chips 30 will return to normal mode 440, thus Ending 450 the Chip Administrator 60 logic methodology.

Figure 8A:
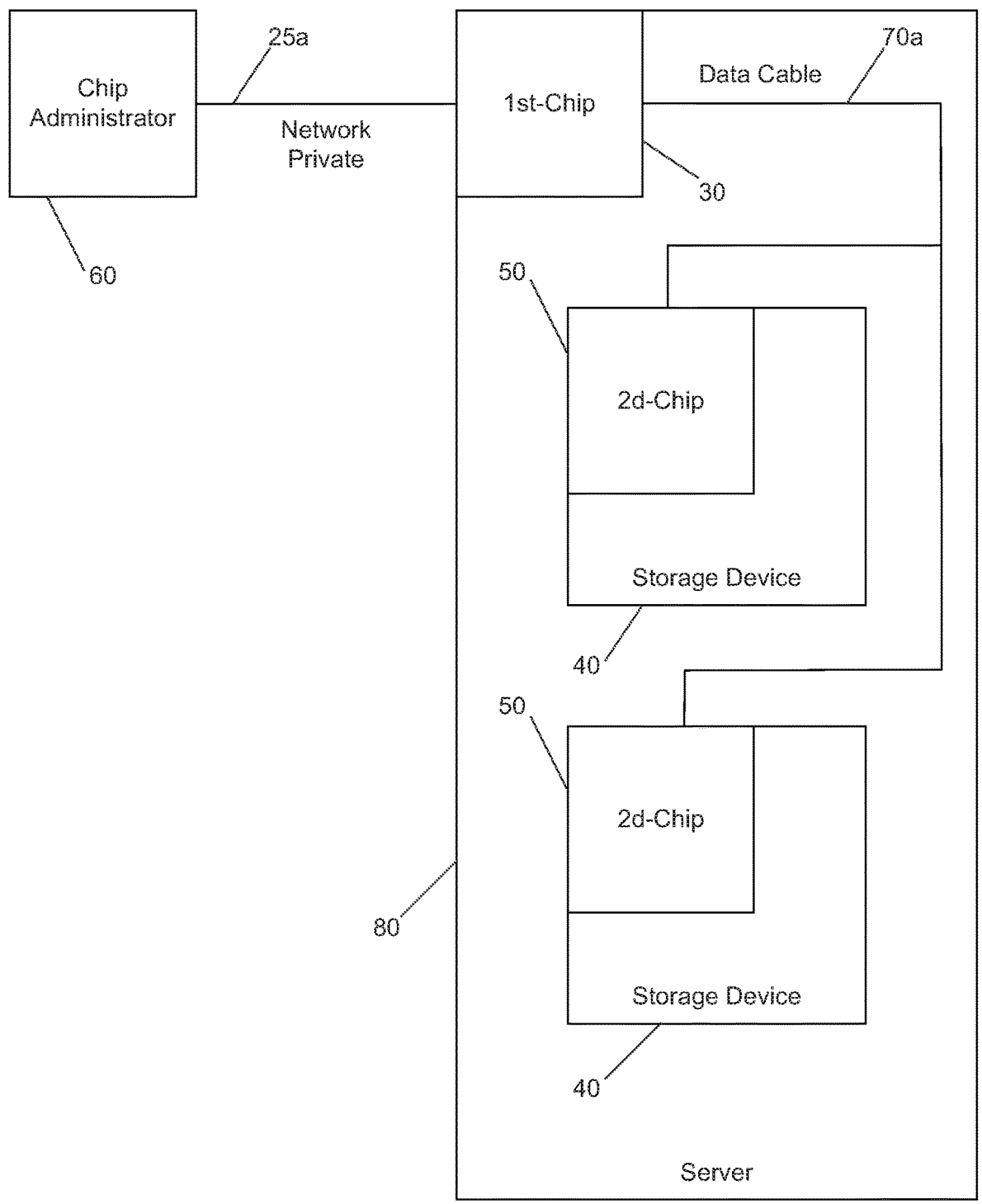
FIG. 8A is a schematic diagram illustrating a Chip Administrator using a Network Private to communicate with a 1st-Chip in an associated Server, and in turn the 1st-Chip communicating with one or more 2d-Chips, each 2d-Chip being attached to a Storage Device.

FIG. 8A illustrates a Chip Administrator 60 using a Network Private 25a to communicate with one or more 1st-Chip 30 each in its associated Server 80. 1st-Chip 30 uses a Data Cable 70a to communicate with one or more 2d-Chip 50 each of which is attached to a Storage Device 40. The Chip Administrator 60, in this configuration, may be restricted to only communicating with 1st-Chip 30 or could be allowed to communicate with one or more 2d-Chips 50 via 1st-Chip 30 and its associated Data Cable 70a.

Figure 8B:
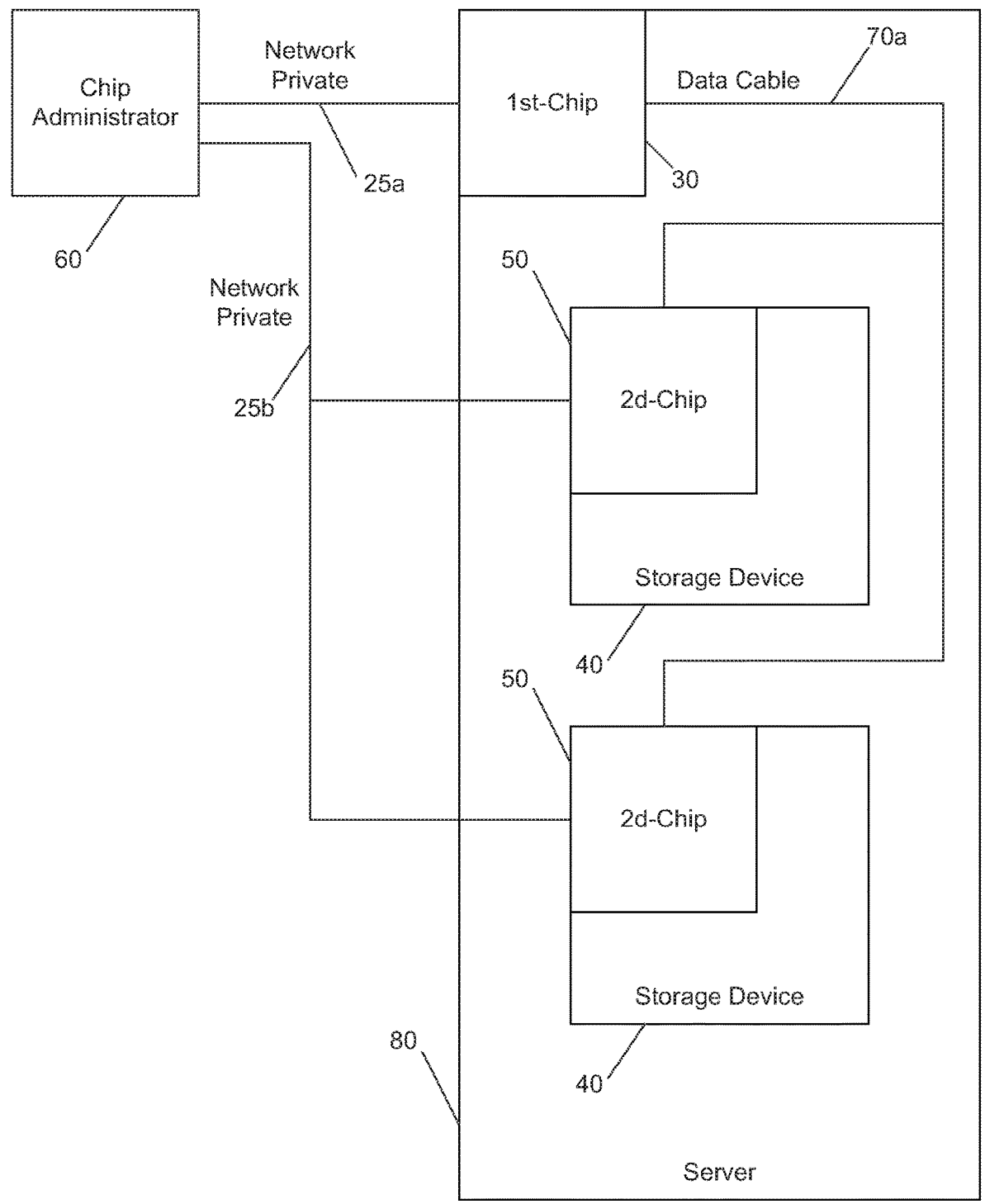
FIG. 8B is a schematic diagram illustrating a Chip Administrator using a Network Private 25a to communicate with a 1st-Chip as in FIG. 8A, and additionally using a different Network Private 25b to separately communicate with one or more 2d-Chips, each 2d-Chip being attached to a Storage Device.

FIG. 8B illustrates a Chip Administrator 60 using a Network Private 25a to communicate with one or more 1st-Chips 30 in their respective Servers 80 and a Network Private 25b to communicate with one or more 2d-Chips 50, each of which are attached to a Storage Device 40. 1st-Chip 30 in Server 80, communicates with all 2d-Chips 50 via a Data Cable 70a. This configuration allows the Chip Administrator 60 a direct channel of communication to all 2d-Chips 50 residing in one or more Servers 80.

FIG. 8C illustrates a Chip Administrator 60 which uses a Network Private 25a to communicate with one or more 1st-Chips 30 residing in a Server 80. Chip Administrator 60 also uses a Network Private 25b which communicates with one or more 2d-Chips 50 by passing the communication through 1st-Chip 30 to a Data Cable 70b. In this embodiment, Data Cable 70a is reserved for communications between 1st-Chip 30 and all 2d-Chips 50 within the associated Server 80. This configuration allows the Chip Administrator 60 to communicate with 1st-Chip 30 which can facilitate a plurality of functions. 1st-Chip 30 can then, in turn, communicate with any of the associated 2d-Chips 50. If the Chip Administrator 60 communicates with 2d-Chips 50 directly via Network Private 25b, the 1st-Chip 30 can still monitor the communication as it passes through it. This allows 1st-Chip 30 to allow, disallow, or modify the communication from the Chip Administrator 60 to the 2d-Chips 50.

FIGS. 9A to 9D illustrate a particularly unique feature of the present invention: a Data Allocation Index 460 comprising the file allocation structure data that is has historically be stored on the media of storage devices. As is explained below, the Data Allocation Index 460 in combination with the first- & second-Chip elements taught herein enable increased efficiencies in the data storage allocation both in terms of process speed and storage media utilization. Additionally, appropriately disposed combinations of the Data Allocation Index 460 feature with a 1st-Chip 30, 2d-Chips 50 and associated Storage Devices 40 efficiently enables practice of parity redundancy and data error detection.

FIG. 9A illustrates a Server 80 with one or more Storage Devices 40, wherein each Storage Device 40 has an associated 2d-Chip 50 connected by a Data Cable 70a to a 1st-Chip 30. The 1st-Chip 30 includes a Data Allocation Index 460 feature where the processing of file allocation commands is accomplished. Historically, the file allocation processing has always resided on the medium of the Storage Device 40. In contrast, the present invention generally moves the file allocation data structure from the medium of all Storage Devices 40 in Server 80 to a Data Allocation Index 460 resident on 1st-Chip 30 in the illustrated embodiment. By substantially abstracting file allocation from the medium of the Storage Devices, the processing of file commands (such as read, write, move, delete, etc.) is more efficiently accomplished. That is, in lieu of asking for the data structure of each Storage Device 40 and then deciding how to facilitate a given command, in the present invention 1st-Chip 30 can read the resident Data Allocation Index 460 and see a complete picture of all data and free space on all Storage Devices 40 and take the appropriate action. The Data Allocation Index 460 is then updated accordingly. Also, by abstracting the file allocation feature from the medium of the Storage Device 40, in the present invention the medium of the Storage Devices 40 is that much more available for storing data.

FIG. 9B illustrates a Server 80 which contains a 1st-Chip 30 communicating via a Data Cable 70a to one or more 2d-Chips 50, wherein each 2d-Chip 50 is associated with a Storage Device 40. As in FIG. 9A, the file allocation feature is abstracted from its traditional location on the Storage Device medium, but in this embodiment, it is accomplished in a different manner. In this embodiment, substantially all file allocation data is stored exclusively on the 2d-Chip 50 as a Data Allocation Index 460, and not on the media of the Storage Drive 40. The present invention departs from past convention by leaving more of the medium of the Storage Devices 40 available for the storing of data.

FIG. 9C illustrates a Server 80 which contains a 1st-Chip 30 and the chips associated Data Allocation Index 460. The 1st-Chip 30 uses a Data Cable 70a to communicate with one or more 2d-Chips 50. Each 2d-Chip 50 contains a Data Allocation Index 460 feature and is associated with a Storage Device 40. The plurality of Data Allocation Indexes 460 can be of a distributed nature or redundant duplicates of the file structure of the storage medium of the Storage Devices 40.

Redundancy would provide the invention with a way to double check Data Allocation Index 460 integrity. A distributed Data Allocation Index 460 allows the 1st-Chip 30 to, as one example, store (the record of) each Storage Device 40 free space while keeping the data structure information for each Storage Device 40 in the Data Allocation Index 460 of the 2d-Chip 50. This would allow the 1st-Chip 30 to parse the creation of a new file to a Storage Device 40 which has the required storage space. The newly written file allocation data would then be added to the Data Allocation Index 460 on the 2d-Chip 50 and the Data Allocation Index 460 on the 1st-Chip 30 would update its storage availability data accordingly.

FIG. 9D illustrates a Server 80 containing a 1st-Chip 30 having a Data Allocation Index 460 and is connected to one or more 2d-Chips 50 via a Data Cable 70a. Each 2d-Chip 50 has its own Data Allocation Index 460 and resides on a Storage Device 40, which has a Data Allocation Index 460 as well. Having three or more distinct Data Allocation Indexes 460 allows the present invention to create parity among the Data Allocation Indexes 460. Parity is achieved with, in this example, three Data Allocation Indexes 460. As an example, parity can be achieved by dividing the file storage data to be stored among the three Data Allocation Indexes 460 into parts "a," "b," and "c" and storing the separate parts in the following manner:

Data Allocation Index 460 on 1st-Chip 30 can host parts "a" and "b."
Data Allocation Index 460 on 2d-Chip 50 can host parts "a" and "c."
Data Allocation Index 460 on Storage Device 40 can host parts "b" and "c."

The present invention has created parity insofar as should one of the three Data Allocation Indexes 460 malfunction, become corrupt, etc., the whole of the data parts "a," "b," and "c" still exists on the two remaining Data Allocation Indexes 460. As more 2d-Chips 50 and Storage Devices 40 are available on the Server 80, the parity can be expanded to include the newly available Data Allocation Indexes 460 to further ensure parity integrity.

Referring now to FIGS. 10a & 10B. FIG. 10A illustrates a Server 80 similar to that of FIG. 8A, hosting a 1st-Chip 30 which uses a Data Cable 70a to communicate with one or more 2d-Chips 50. As in FIG. 8A, in this embodiment, each 2d-Chip 50 is integrated into a Storage Device 40. The instant figure serves to specifically illustrate that replacing the Storage Device 40 also replaces the 2d-Chip 50 in this embodiment. An obvious benefit of this object is that if a drive is removed, its file allocation structure data as stored on the storage medium or in a Data Allocation Index 460 feature of 2d-Chip can go with the drive.

FIG. 10B also illustrates a Server 80 hosting a 1st-Chip 30 which uses a Data Cable 70a to communicate with one or more 2d-Chips 50 as does FIG. 10A. However, in this embodiment, each 2d-Chip 50 is independent of (i.e., abstracted from) the Storage Device 40. In contrast to that FIG. 10A, in this embodiment replacing the Storage Device 40 does not replace the 2d-Chip 50. A benefit and object of this feature is that, with the 2d-Chip 50 being independent of the Storage Device 40, a 2d-Chip 50 can be retrofitted into a nescient existing system inline between the server and a storage device. In practice, retrofit 2d-Chips 50 can be attached or integral to a Data Cable 70a connected to a retrofit 1st-Chip 30 to provide an upgrade cable, by which means, an existing server system can be upgraded with a technology of the present invention.

FIG. 11 illustrates a Network Public 20 connected to a 1st-Chip 30 residing on each of a plurality of Servers 80, in a server system configuration such as in a server farm, as part of an enterprise data center, or as a component of supercomputer. An object of the instant embodiment is to enable combining the computing power of many servers by simultaneously executing one or more applications or processes. In practice the instant embodiment on a large scale, it is intended to serve a part of an enterprise data center or a component of supercomputer. As shown in FIG. 11, the instant embodiment comprises a plurality of servers (80). Within each server 80, the 1st-Chip 30 utilizes a Data Cable 70a to communicate with one or more 2d-Chips 50 which, in turn, are each connected to an associated Storage Device 40. The 1st-Chip 30 can provide RAID beyond any current RAID level functionality. A server 80/1st-Chip 30 set can coordinate with any number of 2d-Chips 50, and each 2d-Chip's associated Storage Device 40. Traditional RAID systems can have a maximum number Storage Devices 40 of six, twelve or twenty-four. The present invention as exemplified in this figure can utilize any number Storage Devices 40 (no maximum) within a Server 80. Further, servers across a multiple server system can be utilized via the Network Private 25a data cable interface. By striping, mirroring, or both, across hundreds of servers 80 and thousands of Storage Devices 40, data read and write speeds can be greatly increased.

Notes: In referring to the Figures, it is to be noted regarding 1st-Chip 30 and its Network Public and Network Private connections: 1st-Chip 30 always has both a Network Public 20 and a Network Private 25/25a connection and sometimes has a Network Private 25b connection as well. Additionally, it is to be noted that throughout this disclosure the Storage Devices 40 are variously referred to and/or illustrated as abstracted from an exemplary server 80 (as in FIGS. 1 & 2) or as part of the exemplary server 80 (as in FIGS. 8A to 11). The embodiments in the figures are fully enabled as illustrated in such manner. However, based on the teachings contained herein, one of ordinary skill in the art would know how to practice the physical disposition of server and storage devices in a particular application to accomplish the benefits and objects of the present invention (such as with a redundant array of independent storage devices).

While the above description contains many specifics, these should not be construed as limitations on the scope of the invention, but rather as exemplifications of one or another preferred embodiment thereof. Other variations are possible, which would be obvious to one skilled in the art. Accordingly, the scope of the invention should be determined by the scope of the appended claims and their equivalents, and not just by the embodiments.

The invention claimed is:

1. A computer server secured data storage system having a distributed and autonomous data security agent for use with a computer server in data communications with a data storage array consisting of a plurality of data storage devices, said secured data storage system comprising:
   a Chip Administrator device in communication via a Network Private link with a first-Chip, the first-Chip resident on the computer server,
      the Chip Administrator having a mother board, a CPU, a RAM, and a third-Firmware to control an operational mode of the data security agent, to provide administrative access to first-Chips and an at least one second-Chips, and to configure the data security agent;
   the first-Chip operable on a Network Public link of the computer server and being a firmware device running a first-Firmware methodology, the methodology managing, controlling, and/or processing Write/Read calls and data transfers between the Network Public link of the computer server and at least one second-Chip associated with said data storage array via a data cable;
   the at least one second-Chip of said distributed and autonomous data security agent being a separate firmware device running a second-Firmware methodology and data transfer between the first-Chip on the computer server and the storage devices of said data storage array via the data cable; and
   the Chip Administrator, first-Chip and second-Chip in combination with their associated first-, second-, and third-Firmwares providing said distributed and autonomous data security agent for said computer server.

2. The computer server secured data storage system of claim 1, wherein the Chip Administrator communicates with at least one first-Chips, each first-Chip resident on a different server.

3. The computer server secured data storage system of claim 1, wherein the Chip Administrator additionally communicates via the 1st-Chip with at least one 2d-Chip via the associated Data Cable.

4. The computer server secured data storage system of claim 1, wherein the Chip Administrator additionally communicates directly via a separate Network Private with at least one 2d-Chip and attached Storage Device, providing the Chip Administrator a direct channel of communication to the 2d-Chip linked via the separate Network Private.

5. The computer server secured data storage system of claim 1, wherein the Chip Administrator additionally communicates via a separate Network Private with 1st-Chip and then indirectly through 1st-Chip and a Data Cable with at least one 2d-Chip and attached Storage Device, enabling the 1st-Chip to monitor Chip Administrator communications passing through it, and to allow, disallow, or modify the communications from the Chip Administrator to the 2d-Chips as appropriate.

6. The computer server secured data storage system of claim 1, wherein the 1st-Chip process file allocation commands and a resultant file allocation structure data is then stored in a Data Allocation Index feature on the 1st-Chip, thereby substantially abstracting file allocation data processing and storage of file allocation structure data from the medium of the Storage Devices and enabling more efficient processing of file allocation commands and allocation data storage.

7. The computer server secured data storage system of claim 1, wherein the 2d-Chips process file allocation commands and a resultant file allocation structure data is then stored in a Data Allocation Index feature on the 2d-Chips, thereby substantially abstracting file allocation data processing and storage of file allocation structure data from the medium of the Storage Devices and enabling more efficient processing of file allocation commands and allocation data storage.

8. The computer server secured data storage system of claim 1, wherein both the 1st-Chip and the 2d-Chips process file allocation commands and a resultant file allocation structure data is then stored in a Data Allocation Index feature on the 1st-Chip and 2d-Chips, thereby substantially abstracting file allocation data processing and storage from the medium of the Storage Devices to enabling more efficient processing of file allocation commands and allocation data storage, and to enable distributed and/or redundant duplicates of the file allocation data structure data.

9. The computer server secured data storage system of claim 1, wherein: the 1st-Chip, the 2d-Chips, and the Storage Devices each includes a Data Allocation Index feature, wherein the processing of file allocation commands is accomplished by the 1st-Chip and the 2d-Chips and a resultant file allocation structure data is parsed and then stored among each of the Data Allocation Indexes, thereby creating set of at least three distinct Data Allocation Indexes of file allocation structure data, substantially abstracting the allocation structure data from the mediums of the Storage Devices and enabling more efficient processing of file allocation commands and allocation data storage, to provide for distributed and/or redundant duplicates of the file allocation data of the storage medium for the Storage Devices amongst the set of at least three distinct Data Allocation Indexes.

10. The computer server secured data storage system of claim 9, wherein the set of at least three distinct Data Allocation Indexes enables creation of parity for overall allocation structure data, by dividing and storing each Storage Device's file allocation structure data in redundant parts amongst each of the Data Allocation Index in the set.

11. The computer server secured data storage system of claim 1, wherein the at least one 2d-Chip of said data security agent being resident on an associated Storage Device, and the Storage Device and 2d-Chip adapted to be replaceable as a unit from said data storage array.

12. The computer server secured data storage system of claim 1, wherein the at least one 2d-Chip of said data security agent being separate from the associated Storage Device, and the Storage Device is adapted to be replaceable from the data storage array separately from its associated 2d-Chip.

13. A Data Cable Device for use with a computer server and data storage array to a provide a computer server secured data storage system, the Data Cable Device comprising:

a Data Cable having at a first-end a 1st-Chip and at a second-end an at least one 2d-Chip;

The 1st-Chip adapted to connect to and communicate with the computer server between the server and a Network Public and a Network Private, the 1st-Chip being a firmware device running a first-Firmware methodology, the methodology managing, controlling, and/or processing Write/Read calls and similar commands, and data transfers between the Network Public link of the computer server and the at least one 2d-Chip;

the at least one 2d-Chip adapted to connect to and communicate with an associated Data Storage Device of the data storage array; and the Data Cable, the 1st-Chip, and the at least one 2d-Chip in combination providing said Data Cable Device for use with a computer server and data storage array to a provide a computer server secured data storage system.

14. A distributed and autonomous data security agent for use with a network of computer servers, each server of which is in data communications with at least one data storage array consisting of a plurality of data storage devices, said secured data storage system comprising:

each of said servers having a 1st-Chip in data communications with a Network Public and a Network Private;

the 1st-Chip is adapted to connect, monitor, and communicate between the computer server and the Network Public, and is adapted to be connectable to a Chip Administrator via the Network Private, the 1st-Chip being a firmware device running a first-Firmware methodology, the methodology managing, controlling, and/or processing Write/Read and similar commands, and data transfers between the Network Public link of the computer server and an at least one 2d-Chip via a data cable;

the Chip Administrator device is in communication with the 1st-Chip resident on the computer server via the Network Private link, the Chip Administrator having a mother board, a CPU, a RAM, and a third-Firmware to control an operational mode of the data security agent, to provide administrative access always to 1st-Chips and/or 2d-Chips in appropriate configurations to configure the data security agent;

the at least one 2d-Chip in communication with the 1st-Chip, and adapted to connect to and communicate with an associated Data Storage Device of the data storage array; and the server/1st-Chip server system in combination with the Chip Administrator coordinate and provide the secured data storage system's function and benefits among and with a large plurality of 2d-Chips, and a plurality of each 2d-Chip's associated Storage Devices.

* * * * *